(12) United States Patent
Johnson et al.

(10) Patent No.: US 12,178,373 B2
(45) Date of Patent: Dec. 31, 2024

(54) INTERFACE FOR ROBOT CLEANER EVACUATION

(71) Applicant: iRobot Corporation, Bedford, MA (US)

(72) Inventors: Wesley D. Johnson, Columbus, OH (US); Benjamin H. Schriesheim, Watertown, MA (US); Qunxi Huang, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 18/626,608

(22) Filed: Apr. 4, 2024

(65) Prior Publication Data

US 2024/0245276 A1  Jul. 25, 2024

Related U.S. Application Data

(63) Continuation of application No. 17/347,834, filed on Jun. 15, 2021, now Pat. No. 11,950,736, which is a
(Continued)

(51) Int. Cl.
*A47L 11/40* (2006.01)
*A47L 9/28* (2006.01)
(Continued)

(52) U.S. Cl.
CPC ......... *A47L 11/4011* (2013.01); *A47L 9/281* (2013.01); *A47L 9/2894* (2013.01);
(Continued)

(58) Field of Classification Search
CPC ......... A47L 2201/02; A47L 2201/024; A47L 2201/04; A47L 11/4025; A47L 9/2894;
(Continued)

(56) References Cited

U.S. PATENT DOCUMENTS

| 8,572,799 B2 | 11/2013 | Won et al. |
| 8,984,708 B2 | 3/2015 | Kuhe et al. |

(Continued)

FOREIGN PATENT DOCUMENTS

| AU | 2019219856 A1 | 3/2020 |
| AU | 2019219856 B2 | 8/2022 |

(Continued)

OTHER PUBLICATIONS

"U.S. Appl. No. 16/122,432, Examiner Interview Summary mailed Feb. 3, 2021", 3 pgs.

(Continued)

*Primary Examiner* — Katina N. Henson
(74) *Attorney, Agent, or Firm* — Schwegman Lundberg & Woessner, P.A.

(57) ABSTRACT

A method of operating an autonomous cleaning robot is provided. The method includes receiving, at a handheld computing device, data representing a status of a debris collection bin of the autonomous cleaning robot, the status of the bin including a bin fullness reading. The method also includes receiving, at the handheld computing device, data representing a status of a filter bag of an evacuation station, the status of the filter bag including a bag fullness reading. The method also includes presenting, on a display of the handheld computing device, a first status indicator representing the bin fullness reading, and presenting, on the display of the handheld computing device, a second status indicator representing the bag fullness reading.

20 Claims, 12 Drawing Sheets

Related U.S. Application Data continuation of application No. 16/122,432, filed on Sep. 5, 2018, now Pat. No. 11,039,725.

(51) Int. Cl.
  G05D 1/00 (2006.01)
  G05D 1/227 (2024.01)
  G05D 1/661 (2024.01)

(52) U.S. Cl.
  CPC ........ A47L 11/4025 (2013.01); G05D 1/0088 (2013.01); G05D 1/0225 (2013.01); G05D 1/227 (2024.01); G05D 1/661 (2024.01); *A47L 2201/024* (2013.01); *A47L 2201/04* (2013.01)

(58) Field of Classification Search
  CPC ................. A47L 9/281; A47L 11/4011; G05D 2201/0203; G05D 2201/0215; G05D 1/0088; G05D 1/0225; G05D 1/227
  USPC .......................................................... 15/319
  See application file for complete search history.

(56) References Cited

U.S. PATENT DOCUMENTS

| | | | |
|---|---|---|---|
| 9,462,920 | B1 | 10/2016 | Morin et al. |
| 9,492,048 | B2 | 11/2016 | Won et al. |
| 9,788,698 | B2 | 10/2017 | Morin et al. |
| 9,931,007 | B2 | 4/2018 | Morin et al. |
| 11,039,725 | B2 | 6/2021 | Johnson et al. |
| 11,950,736 | B2 | 4/2024 | Johnson et al. |
| 2008/0281470 | A1 | 11/2008 | Gilbert, Jr. et al. |
| 2014/0207282 | A1* | 7/2014 | Angle ............... B25J 13/006 901/1 |
| 2016/0166126 | A1* | 6/2016 | Morin ................... A47L 9/2805 15/319 |
| 2016/0183752 | A1 | 6/2016 | Morin et al. |
| 2016/0374528 | A1 | 12/2016 | Morin et al. |
| 2018/0014709 | A1 | 1/2018 | O'Brien et al. |
| 2018/0071918 | A1* | 3/2018 | Angle ................... G05B 15/02 |
| 2018/0074508 | A1 | 3/2018 | Kleiner et al. |
| 2018/0177369 | A1 | 6/2018 | Morin et al. |
| 2020/0069139 | A1 | 3/2020 | Johnson et al. |
| 2021/0307582 | A1 | 10/2021 | Johnson et al. |

FOREIGN PATENT DOCUMENTS

| | | |
|---|---|---|
| CN | 107405031 A | 11/2017 |
| CN | 107529930 A | 1/2018 |
| CN | 107811578 A | 3/2018 |
| CN | 109195751 A | 1/2019 |
| CN | 109431376 A | 3/2019 |
| CN | 109528088 A | 3/2019 |
| CN | 110876587 A | 3/2020 |
| CN | 114983270 A | 9/2022 |
| CN | 114983270 B | 12/2023 |
| JP | 2015035667 A | 2/2015 |
| JP | 2017536938 A | 12/2017 |
| JP | 2018500998 A | 1/2018 |
| JP | 2018522613 A | 8/2018 |
| JP | 7374156 B2 | 10/2023 |
| WO | WO-2007137234 A2 | 11/2007 |
| WO | WO-2016105702 A1 | 6/2016 |

OTHER PUBLICATIONS

"U.S. Appl. No. 16/122,432, Non Final Office Action mailed Oct. 22, 2020", 19 pgs.
"U.S. Appl. No. 16/122,432, Notice of Allowance mailed May 4, 2021", 10 pgs.
"U.S. Appl. No. 16/122,432, Response filed Jan. 22, 2021 to Non Final Office Action mailed Oct. 22, 2020", 12 pgs.
"U.S. Appl. No. 16/122,432, Response filed Oct. 1, 2020 to Restriction Requirement mailed Aug. 10, 2020", 9 pgs.
"U.S. Appl. No. 16/122,432, Restriction Requirement mailed Aug. 10, 2020", 6 pgs.
"U.S. Appl. No. 17/347,834, Advisory Action mailed Feb. 15, 2023", 3 pgs.
"U.S. Appl. No. 17/347,834, Advisory Action mailed Oct. 10, 2023", 3 pgs.
"U.S. Appl. No. 17/347,834, Examiner Interview Summary mailed Jan. 27, 2023", 2 pgs.
"U.S. Appl. No. 17/347,834, Examiner Interview Summary mailed Jun. 16, 2023", 2 pgs.
"U.S. Appl. No. 17/347,834, Examiner Interview Summary mailed Sep. 18, 2023", 2 pgs.
"U.S. Appl. No. 17/347,834, Examiner Interview Summary mailed Nov. 18, 2022", 2 pgs.
"U.S. Appl. No. 17/347,834, Final Office Action mailed Jun. 28, 2023", 12 pgs.
"U.S. Appl. No. 17/347,834, Final Office Action mailed Dec. 1, 2022", 11 pgs.
"U.S. Appl. No. 17/347,834, Non Final Office Action mailed Mar. 10, 2023", 11 pgs.
"U.S. Appl. No. 17/347,834, Non Final Office Action mailed Aug. 3, 2022", 10 pgs.
"U.S. Appl. No. 17/347,834, Non Final Office Action mailed Nov. 6, 2023", 11 pgs.
"U.S. Appl. No. 17/347,834, Notice of Allowance mailed Feb. 23, 2024", 7 pgs.
"U.S. Appl. No. 17/347,834, Response filed Jan. 24, 2023 to Final Office Action mailed Dec. 1, 2022", 9 pgs.
"U.S. Appl. No. 17/347,834, Response filed Feb. 9, 2024 to Non Final Office Action mailed Nov. 6, 2023", 8 pgs.
"U.S. Appl. No. 17/347,834, Response filed Jun. 12, 2023 to Non Final Office Action mailed Mar. 10, 2023", 8 pgs.
"U.S. Appl. No. 17/347,834, Response filed Sep. 27, 2023 to Final Office Action mailed Jun. 28, 2023", 10 pgs.
"U.S. Appl. No. 17/347,834, Response Filed Nov. 18, 2022 to Non-Final Office Action Mailed Aug. 3, 2022", 9 pgs.
"Australian Application Serial No. 2019219856, First Examination Report mailed Nov. 19, 2021", 3 pgs.
"Australian Application Serial No. 2019219856, Response filed Mar. 7, 2022 to First Examination Report mailed Nov. 19, 2021", 13 pgs.
"Australian Application Serial No. 2022206790, First Examination Report mailed Jan. 19, 2024", 4 pgs.
"Chinese Application Serial No. 201910827494.3, Office Action mailed Nov. 3, 2021", w/o English Translation, 5 pgs.
"Chinese Application Serial No. 201910827494.3, Response filed Mar. 2, 2022 to Office Action mailed Nov. 3, 2021", w/ English Claims, 8 pgs.
"Chinese Application Serial No. 202210488933.4, Office Action mailed Jul. 5, 2023", w/ English Translation, 24 pgs.
"Chinese Application Serial No. 202210488933.4, Response filed Sep. 17, 2023 to Office Action mailed Jul. 5, 2023", w/ english claims, 28 pgs.
"European Application Serial No. 19195350.4, Communication Pursuant to Article 94(3) EPC mailed Mar. 9, 2020", 5 pgs.
"European Application Serial No. 19195350.4, Extended European Search Report mailed Feb. 21, 2020", 4 pgs.
"European Application Serial No. 19195350.4, Response filed Jul. 14, 2020 to Communication Pursuant to Article 94(3) EPC mailed Mar. 9, 2020", 21 pgs.
"European Application Serial No. 21183726.5, Extended European Search Report mailed Feb. 11, 2022", 5 pgs.
"European Application Serial No. 21183726.5, Response filed Sep. 30, 2021 to Invitation to Remedy Deficiencies (R. 58 EPC) mailed Jul. 23, 2021", 7 pgs.
"European Application Serial No. 22214046.9, Extended European Search Report mailed Jun. 15, 2023", 8 pgs.
"European Application Serial No. 22214046.9, Response filed Jan. 9, 2024 to Extended European Search Report mailed Jun. 15, 2023", 10 pgs.
"Japanese Application Serial No. 2021-164072, Notification of Reasons for Refusal mailed Mar. 6, 2023", w/ English Translation, 9 pgs.

(56) References Cited

OTHER PUBLICATIONS

"Japanese Application Serial No. 2021-164072, Response filed May 31, 2023 to Notification of Reasons for Refusal mailed Mar. 6, 2023", w/ english claims, 9 pgs.

"U.S. Appl. No. 15/858,550, filed Dec. 29, 2017", U.S. Pat. No. 10,737,395B2, 32 pgs.

Wolff, et al., "U.S. Appl. No. 15/971,322, filed May 4, 2018", US 2019/0335967 A1, 22 pgs.

U.S. Appl. No. 16/122,432 U.S. Pat. No. 11,039,725, filed Sep. 5, 2018, Interface for Robot Cleaner evacuation.

U.S. Appl. No. 17/347,834 U.S. Pat. No. 11,950,736, filed Jun. 15, 2021, Interface for Robot Cleaner Evacuation.

"Australian Application Serial No. 2022206790, Response filed Oct. 3, 2024 to First Examination Report mailed Jan. 19, 2024", 9 pgs.

\* cited by examiner

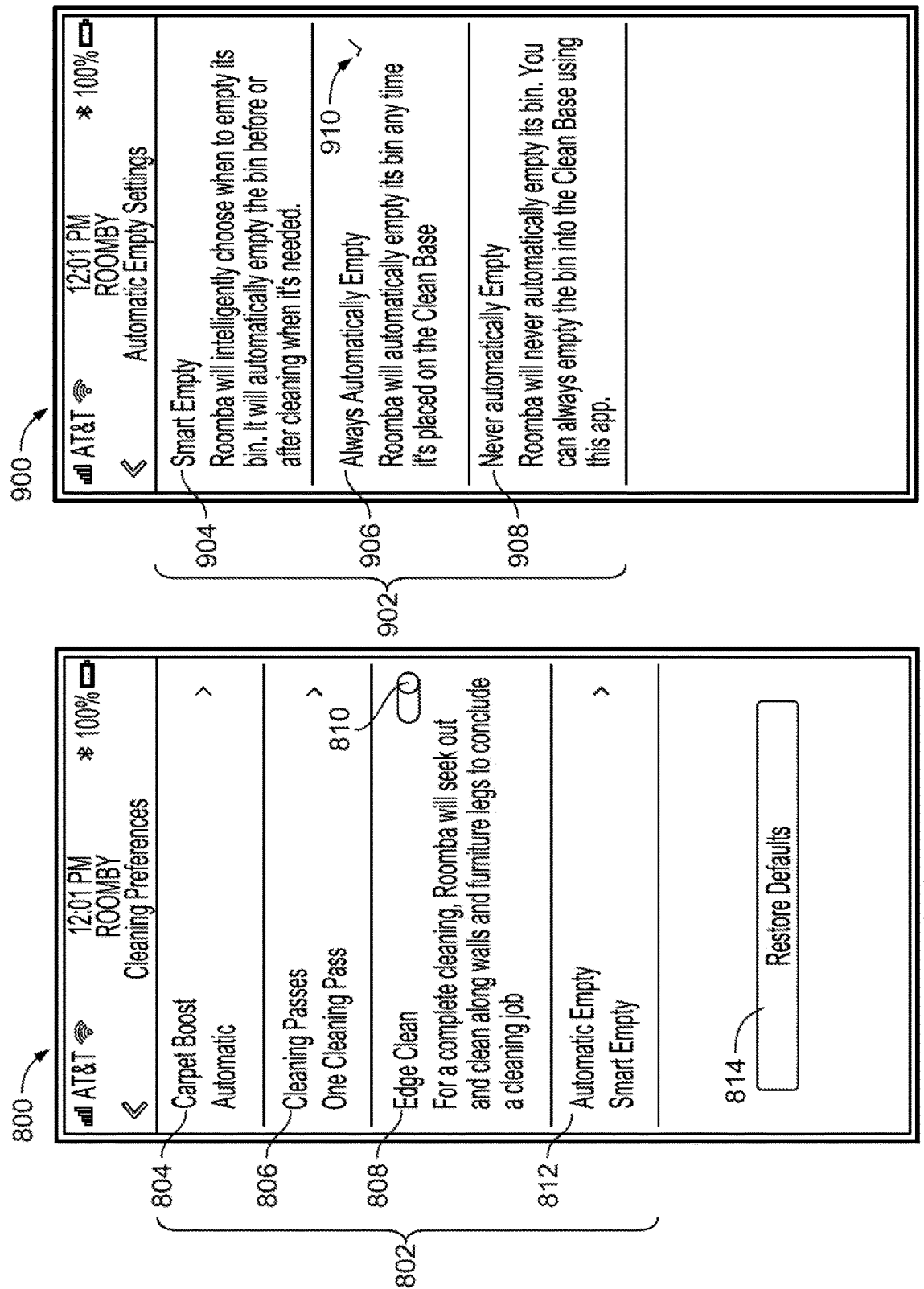

INTERFACE FOR ROBOT CLEANER EVACUATION

PRIORITY APPLICATIONS

This application is a continuation of U.S. patent application Ser. No. 17/347,834, filed Jun. 15, 2021, which application is a continuation of U.S. patent application Ser. No. 16/122,432, filed Sep. 5, 2018, issued on Jun. 22, 2021 as U.S. Pat. No. 11,039,725, the contents of which are incorporated herein by reference in their entireties.

TECHNICAL FIELD

This specification relates generally to control systems for autonomous cleaning robots and evacuation stations. In one exemplary system, a user interface is used for monitoring and controlling an autonomous cleaning robot and an evacuation station.

BACKGROUND

Autonomous cleaning robots are robots that can perform desired cleaning operations, such as vacuum cleaning, in environments without continuous human guidance. An autonomous cleaning robot can automatically dock with an evacuation station for the purpose of emptying its debris bin of vacuumed debris. During an evacuation operation, the evacuation station can draw debris collected by the robot into the evacuation station. The drawn debris can be stored in a receptacle within the evacuation station. When the debris collected in the receptacle has reached a debris capacity of the receptacle, a user can manually remove the debris so that the evacuation station can perform additional evacuation operations.

SUMMARY

Described herein are examples of methods and devices for controlling and monitoring autonomous robots configured to traverse floor surfaces and perform various operations including, but not limited to, cleaning. An autonomous cleaning robot may interface with an evacuation station to empty a debris collection bin of the autonomous cleaning robot into a filter bag in the evacuation station. Statuses of the autonomous cleaning robot and the evacuation station may be presented on a display of a mobile device for monitoring, user control, etc. Advantages of the foregoing may include, but are not limited to, those described below and herein elsewhere.

An advantage described herein is that a mobile application executed by the mobile device can present statuses of the robot and of the evacuation station for remote monitoring by a user. As such, the user may monitor and control the robot from a remote location, e.g., his/her work place, etc., during a scheduled cleaning run. The user may also change automatic evacuation settings such that the autonomous cleaning robot will empty the debris bin without repeated input from the user. This process allows for efficient cleaning and less down time being experienced by the robot while waiting for instructions from a user. Additionally, the mobile application can present instructions for fixing common problems experienced at the evacuation station, e.g., the filter bag is full, as the status is presented.

In one aspect, the present specification provides a method of operating an autonomous cleaning robot. The method includes receiving, at a handheld computing device, data representing a status of a debris collection bin of the autonomous cleaning robot, the status of the bin including a bin fullness reading. The method also includes receiving, at the handheld computing device, data representing a status of a filter bag of an evacuation station, the status of the filter bag including a bag fullness reading. The method also includes presenting, on a display of the handheld computing device, a first status indicator representing the bin fullness reading, and presenting, on the display of the handheld computing device, a second status indicator representing the bag fullness reading.

In some implementations, the first status indicator indicates that the bin of the autonomous cleaning robot is full.

In some implementations, the second status indicator indicates that the filter bag of the evacuation station is full.

In some implementations, the method also includes initiating a transmission from the handheld computing device to the autonomous cleaning robot, the transmission including data for causing the autonomous cleaning robot to dock at the evacuation station and empty the bin.

In some implementations, the method also includes receiving at the handheld computing device, from the autonomous cleaning robot, a notification that the bin is empty.

In some implementations, the method also includes presenting, on the display of the handheld computing device, a count representing a number of instances that the bin has been emptied.

In some implementations, the method also includes initiating a transmission to the autonomous cleaning robot, the transmission including data for causing the autonomous cleaning robot to continue cleaning when the bin fullness reading indicates the bin is full.

In some implementations, the method also includes initiating a transmission to the autonomous cleaning robot, the transmission including data for causing the autonomous cleaning robot to dock at the evacuation station and empty the bin based on one or more conditions being satisfied.

In some implementations, the method also includes presenting, on the display of the handheld computing device, a progress graphic configured to indicate a level of completion of emptying the bin of the autonomous cleaning robot by the evacuation station.

In some implementations, the method also includes presenting on the display of the handheld computing device, a time indicator representing an amount of time elapsed for emptying the bin of the autonomous cleaning robot at the evacuation station.

In some implementations, the data representing the status of the debris collection bin of the autonomous cleaning robot received at the handheld computing device is received from the autonomous cleaning robot.

In some implementations, the data representing the status of the filter bag of the evacuation station received at the handheld computing device is received from the autonomous cleaning robot.

In another aspect, a handheld computing device including one or more inputs, a display, and a processor is disclosed. The processor is configured to receive data representing a status of a bin of an autonomous cleaning robot, the status of the bin including a bin fullness reading. The processor is configured to receive data representing a status of a filter bag of an evacuation station, the status of the filter bag including a bag fullness reading. The processor is configured to present, on a display of the handheld computing device, a first status indicator representing the bin fullness reading. The processor is configured to present, on the display of the handheld computing device, a second status indicator representing the bag fullness reading.

In some implementations, wherein the first status indicator indicates that the bin of the autonomous cleaning robot is full.

In some implementations, the second status indicator indicates that the filter bag of an evacuation station is full.

In some implementations, the processor is further configured to initiate a transmission to the autonomous cleaning robot, the transmission including data for causing the autonomous cleaning robot to dock at the evacuation station and empty the bin.

In some implementations, the processor is further configured to receive, from the autonomous cleaning robot, a notification that the bin is empty.

In some implementations, the processor is further configured to present, on the display, a count representing a number of instances that the bin has been emptied.

In some implementations, the processor is further configured to present, on the display of the handheld computing device, a time indicator representing an amount of time elapsed for emptying the bin of the autonomous cleaning robot at the evacuation station.

In some implementations, the processor is further configured to initiate a transmission to the autonomous cleaning robot, the transmission including data for causing the autonomous cleaning robot to continue cleaning after the bin fullness reading indicates the bin is full.

In some implementations, the processor is further configured to initiate a transmission to the autonomous cleaning robot, the transmission including data for causing the autonomous cleaning robot to dock at the evacuation station and empty the bin based on one or more conditions being satisfied.

In some implementations, the processor is further configured to present, on the display of the handheld computing device, a progress graphic configured to indicate a level of completion of emptying the bin of the autonomous cleaning robot by the evacuation station.

In some implementations, the processor is configured to receive the data representing the status of the bin of the autonomous cleaning robot from the autonomous cleaning robot.

In some implementations, the processor is configured to receive the data representing the status of the filter bag of the evacuation station from the autonomous cleaning robot.

In another aspect, an evacuation station is disclosed. The evacuation station includes a docking platform configured to receive an autonomous cleaning robot, one or more conduits including an intake configured to interface with the autonomous cleaning robot, a filter bag configured to receive debris evacuated from the autonomous cleaning robot, an indicator configured to present a status of the evacuation station, and a transceiver configured to communicate with the autonomous cleaning robot, wherein the transceiver is configured to send a signal to the autonomous cleaning robot based on the status of the evacuation station.

In some implementations, the indicator includes a light emitting diode (LED) configured to change from a first state to a second state based on the status of the evacuation station. In some instances, changing from the first state to the second state includes changing a color of the LED. In some instances, changing from the first state to the second state includes changing a blinking pattern of the LED. In some instances, the second state represents an error condition at the evacuation station. In some instances, the error condition represents the evacuation station being clogged. In some instances, the error condition represents the filter bag of the evacuation station being full. In some instances, the error condition represents the filter bag of the evacuation station being absent. In some instances, the error condition represents a communication error between the autonomous cleaning robot and the evacuation station. In some instances, the error condition represents an unsealed lid of the evacuation station. In some instances, the error condition represents a motor malfunction.

In some implementations, the signal includes a control signal for causing the autonomous cleaning robot to emit an audio signal.

In some implementations, the signal includes a control signal for causing the autonomous cleaning robot to illuminate an indicator on the autonomous cleaning robot.

The details of one or more implementations are set forth in the accompanying drawings and the description below. Other features and advantages will be apparent from the description and drawings, and from the claims.

BRIEF DESCRIPTION OF DRAWINGS

FIG. 8 is an interface showing a cleaning preferences menu.

FIG. 9 is an interface showing an automatic empty settings menu.

DETAILED DESCRIPTION

An executable application can be used to control autonomous robots configured to traverse floor surfaces and perform various operations including, but not limited to, cleaning. An autonomous cleaning robot may interface with an evacuation station to empty a debris collection bin of the autonomous cleaning robot into a filter bag in the evacuation station. Statuses of the autonomous cleaning robot and the evacuation station may be presented on a display of a mobile device for monitoring and for user control.

Figure 1:
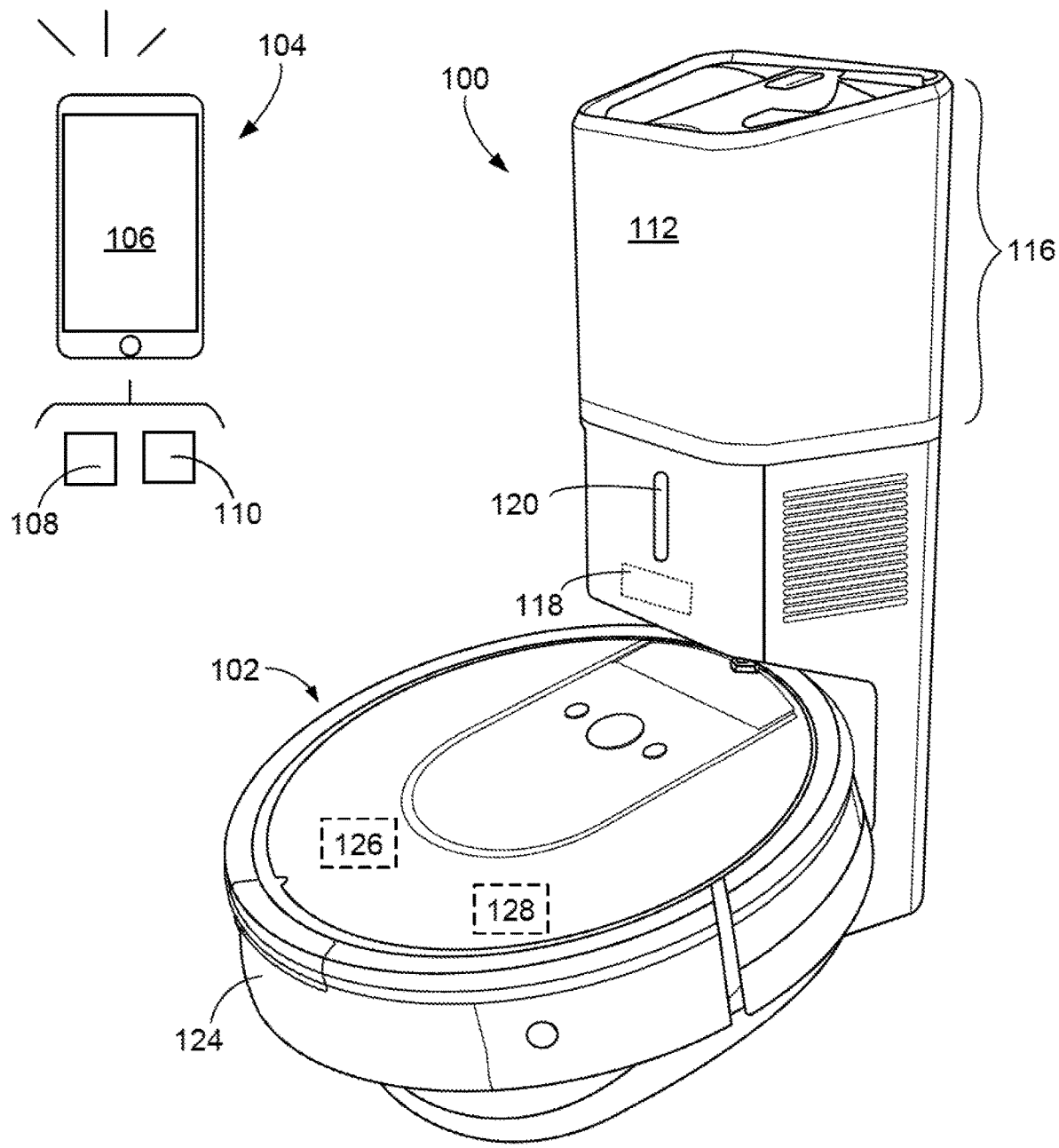
FIG. 1 illustrates an environment including an autonomous cleaning robot, a handheld computing device, and an evacuation station.

Referring to FIG. 1, a system, e.g., a debris collection and monitoring system, including an evacuation station 100, an autonomous cleaning robot 102, and a handheld computing device (mobile device 104), is shown. The evacuation station 100 performs an evacuation operation when the autonomous cleaning robot 102 and the evacuation station 100 are interfaced with one another. The robot 102 performs a cleaning operation in a room, e.g., a room of a commercial, residential, industrial, or other type of building, and collects debris from a floor surface of the room as the robot 102 autonomously moves about the room. The robot 102 is enabled to collect the debris from the floor surface. For example, an included air mover 128 draws air from a portion of the floor surface below the robot 102 and hence draws any debris on that portion of the floor surface into the robot 102. The robot 102 can also include one or more rotatable members (not shown) facing the floor surface that engage the debris on the floor surface and mechanically moves the debris into the robot 102. The one or more rotatable members can include a roller, a brush, a flapper brush, or other rotatable implements that can engage debris and direct the debris into the robot 102. The debris collected from the floor surface is directed into a debris bin 124 of the robot 102. A controller 126 of the robot 102 operates a drive system (not shown) of the robot 102, e.g., including motors and wheels that are operable to propel the robot 102 across the floor surface, to navigate the robot 102 about the room and thereby clean different portions of the room.

During the cleaning operation, the controller 126 can determine that the debris bin 124 is full. For example, the controller 126 can determine that debris accumulated in the debris bin 124 has exceeded a certain percentage of the total debris capacity of the debris bin 124, e.g., more than 70%, 80%, or 90% of the total debris capacity of the debris bin 124. After making such a determination, the controller 126 operates the drive system of the robot 102 to direct the robot 102 toward the evacuation station 100. In some implementations, the robot 102 includes a sensor system including an optical sensor, an acoustic sensor, or other appropriate sensor for detecting the evacuation station 100 during the robot's navigation about the room to find the evacuation station 100.

The evacuation station 100 can perform an evacuation operation to draw debris from the debris bin 124 of the robot 102 into the evacuation station 100. To enable the evacuation station 100 to remove debris from the robot 102, the robot 102 interfaces with the evacuation station 100 as shown in FIG. 1. For example, the robot 102 can autonomously move relative to the evacuation station 100 to physically dock to the evacuation station 100. In other implementations, a conduit (not shown) of the evacuation station 100 is manually connected to the robot 102. To interface with the evacuation station 100, in some implementations, an underside of the robot 102 includes an outlet (not shown) that engages with an intake 218 of the evacuation station 100, shown in FIG. 2A. For example, the outlet of the robot 102 can be located on an underside of the debris bin 124 and can be an opening that engages with a corresponding opening of the intake 218.

One or both of the robot 102 and the evacuation station 100 can include a valve mechanism that opens only when the air mover 216 generates a negative pressure during the evacuation operation. For example, a valve mechanism (not shown) of the robot 102 can include a door, flap, or other openable device that only opens in response to a negative pressure on the underside of the debris bin 124, e.g., a negative pressure generated by the air mover 216 of the evacuation station 100.

While the robot 102 interfaces with the evacuation station 100, the debris bin 124 is in pneumatic communication with the air mover 216 of the evacuation station 100. In addition, in some implementations, the robot 102 is in electrical communication with the evacuation station 100 such that the evacuation station 100 can charge a battery of the robot 102 when the robot 102 interfaces with the evacuation station 100. Thus, while interfaced with the robot 102, the evacuation station 100 can simultaneously evacuate debris from the robot 102 and charge the battery of the robot 102. In other implementations, the evacuation station 100 charges the battery of the robot 102 only while the evacuation station 100 is not evacuating debris from the robot 102.

Referring also to FIG. 1, the robot 102 and the evacuation station 100 are configured to communicate with the mobile device 104. A mobile device 104 as described herein may include a smart phone, a cellular phone, personal digital assistant, laptop computer, tablet, smart watch, or other portable (e.g., handheld) computing device capable of transmitting and receiving signals related to a robot cleaning mission. The mobile device 104 is configured to present, on a display 106, information relating to a status of the robot 102, a status of the evacuation station 100, information relating to robot cleaning mission, etc. The mobile device 104 is also configured to receive an input from a user. The mobile device 104 includes a processor 108 configured to initiate data transmission and reception (via the internet, etc.) with the robot 102 and run a mobile application 110 configured to present interfaces relating to statuses of the robot 102 and evacuation station 100, on the display 104.

The evacuation station 100 includes an indicator 120 configured to indicate a status of the evacuation station. In this example, the indicator 120 is pill shaped. In some implementations, the indicator 120 includes a light emitting diode (LED) configured to change colors, be dimmed, and pulse in different patterns. For example, in some implementations, the indicator 120 may pulse red to indicate a problem needing attention (e.g., a clog, a sealing error (e.g., the top portion is not closed, the filter bag is not installed properly, etc.), a motor failure). In other implementations, the indicator 120 may present as solid red to indicate a problem at the evacuation station 100 needing attention. For example, the indicator 120 may display as solid red when a filter bag of the evacuation station 100, positioned in a housing 112 of a top portion 116 of the evacuation station, is full. The indicator 120 may also display as solid red when the filter bag is absent from the evacuation station 100. In some implementations, the indicator 120 may display as solid white to indicate a successful evacuation of the robot 102.

Figure 2B:
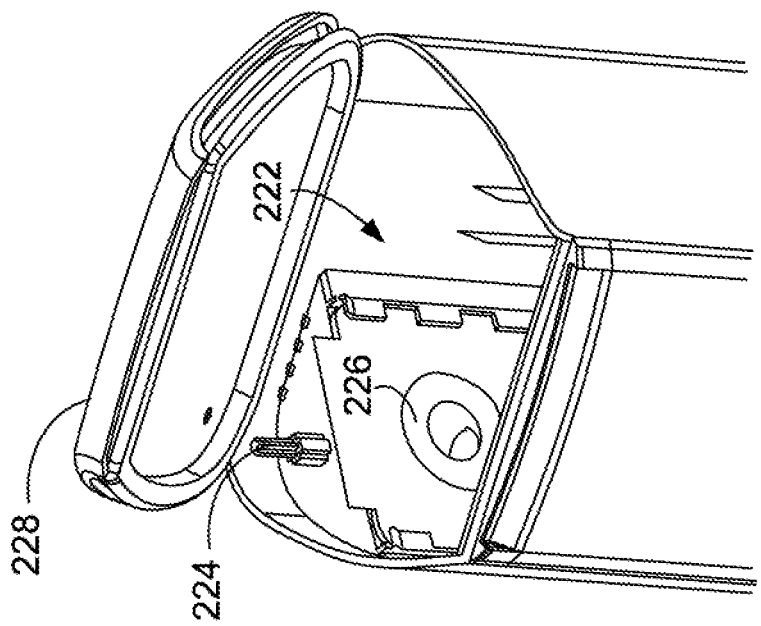
FIG. 2B is a top view of an upper portion of the evacuation station of FIG. 1.
Figure 2A:
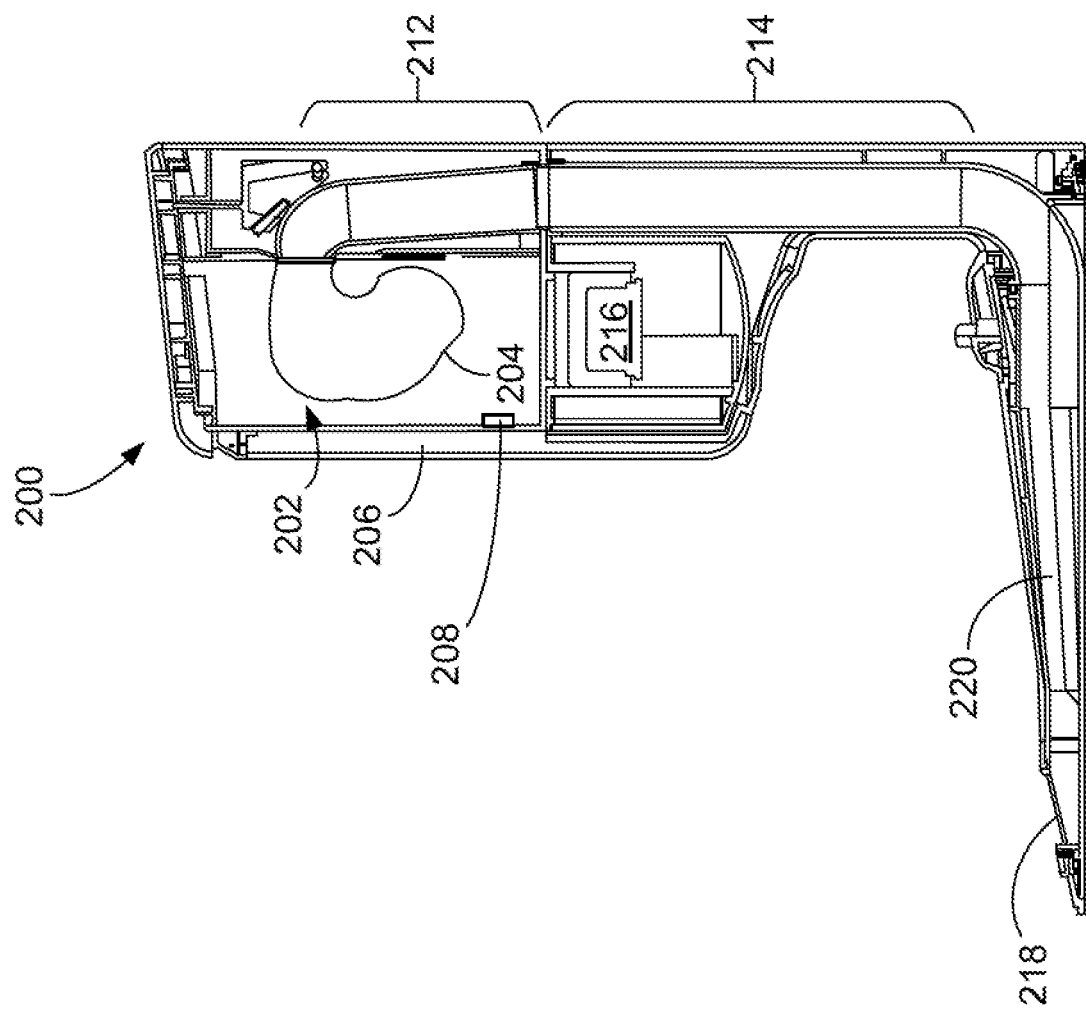
FIG. 2A is a side cross-sectional view of the evacuation station of FIG. 1.

Referring to FIGS. 2A and 2B, during the evacuation operation while the evacuation station 200 is interfaced with the robot 102, an airflow generated by the evacuation station 200 travels through the debris bin 124, through airflow pathways of the evacuation station 200, and through a filtering device 202 while carrying debris drawn from the robot 102. The airflow pathways of the evacuation station 200 include the one or more conduits of the evacuation station 200. In addition to including the conduit 212, the one or more conduits can also include conduits 220, 214. The conduit 220 includes the intake 218 of the evacuation station 200 and is connected with the conduit 214, and the conduit 214 is connected with the conduit 212. In this regard, the airflow travels through the one or more conduits of the evacuation station 100 by travelling through the conduit 220, the conduit 214, and conduit 212. The airflow exits the one or more conduits through the outlet 226 into the inlet 306 (shown in FIG. 3A) of the filtering device 202, and then travels through the conduit 308 (shown in FIG. 3A). The airflow further travels through a wall of a filter bag 204 toward the air mover 216. The wall of the filter bag 204 serves as a filtering mechanism, separating a portion of the debris from the airflow.

As described herein, the evacuation station 200 can continue to perform the evacuation operation until a sensor 208 of the evacuation station 200 detects that the filter bag 204 is full. In some implementations, the sensor 208 is positioned proximate a flow path for the flow of air. As described herein, in some implementations, the sensor 208 is a pressure sensor. In other implementations, the sensor 208 is an optical sensor, a force sensor, or other sensor that can generate one or more signal indicative of a fullness state of the filtering device 202.

The filtering device 202 (including filter bag 204) is disconnectable and removable from the evacuation station 200. Referring to FIG. 2B, the housing 206 of the evacuation station 200 includes a cover 228 along a top portion of the evacuation station 200. The cover 228 covers a receptacle 222 of the evacuation station 200. The receptacle 222 can receive the filtering device 202. The cover 228 is movable between a closed position (shown in FIG. 2A) and an open position (shown in FIG. 2B). In the open position of the cover 228, a filtering device is insertable into the receptacle 222 or is removable from the receptacle 222. For example, the filtering device 202 can be placed into the receptacle to be connected with the one or more conduits of the evacuation station 200. In addition, the filtering device 202 can be disconnected from the one or more conduits of the evacuation station and then removed from the receptacle 222, thereby enabling a new filtering device to be inserted into the receptacle.

Figure 3A:
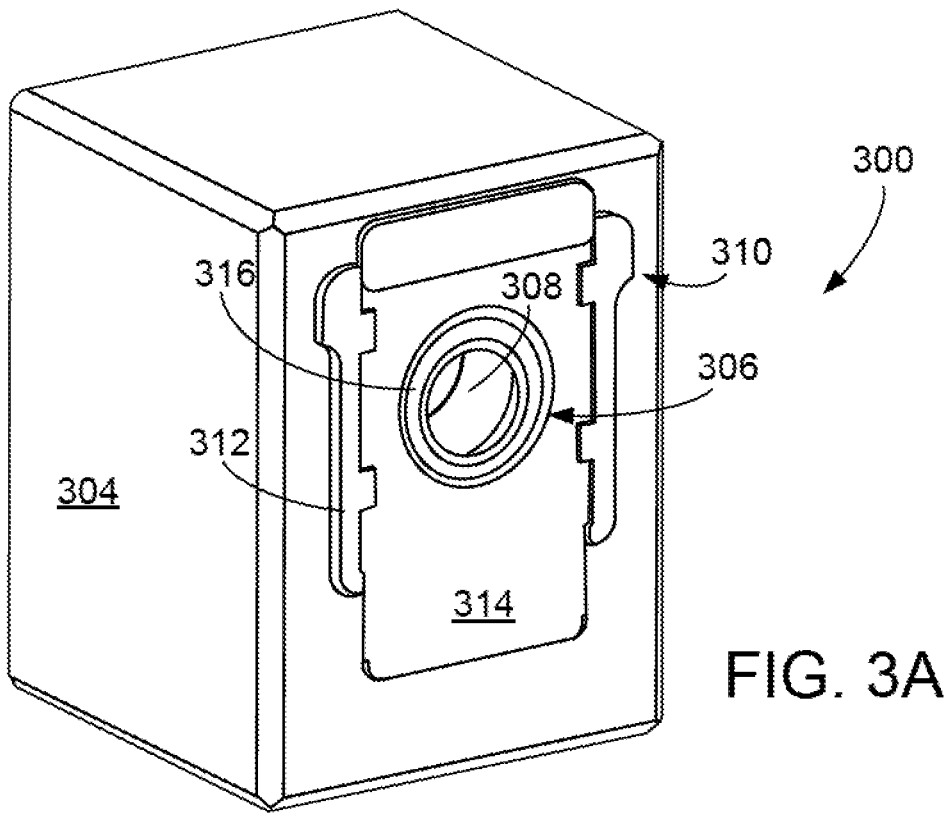
FIG. 3A is a front perspective view of the filtering device of FIG. 1.
Figure 3B:
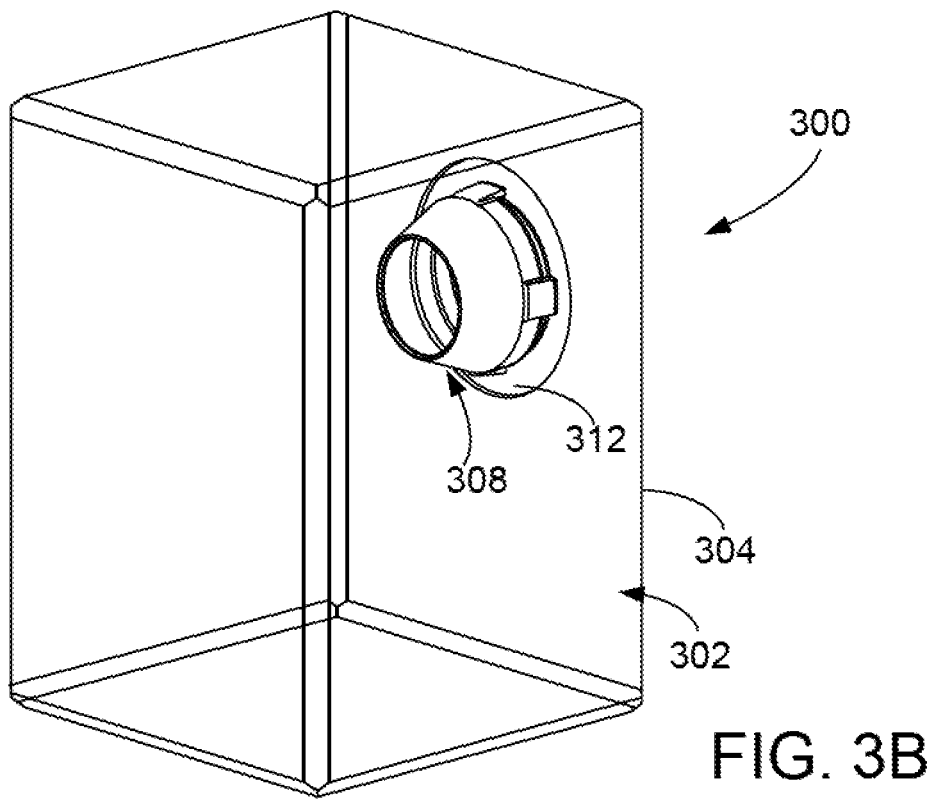
FIG. 3B is a side perspective view of the filtering device of FIG. 1 in which a filter bag of the filtering device is shown as transparent.

FIGS. 3A-3B illustrate an example of a filtering device 300. Referring to FIG. 3A, the filtering device 300, as described herein, includes a filter bag 304, the inlet 306, and an interface assembly 310. In this example, the filter bag 304 is approximately cube shaped. The filtering device 300 can be disposable, e.g., after the debris collected in the filter bag 304 has exceeded a certain debris capacity of the receptacle 302.

The filter bag 304 at least partially forms the receptacle 302 and is formed of a material through which air can travel. The material of the filter bag 304 is selected such that the filter bag 304 can serve as a separator that separates and filters at least a portion of the debris out of the airflow generated by the evacuation station 200. For example, the filter bag 304 can be formed of paper or fabric that allows air to pass through but traps dirt and debris and thereby retains the debris within the receptacle 302. The material of the filter bag 304 is flexible, enabling the filter bag 304 to be folded and easily stored. In addition, the filter bag 304 can expand to accommodate additional debris as the filter bag 304 collects debris during an evacuation operation. The filter bag 304, while collecting debris via filtration, is porous to permit the airflow to exit the filter bag 304 with an amount of debris less than the amount of debris with the airflow as the airflow enters the filtering device 300. For example, the filter bag 304 can collect debris having a width larger than 1 micrometer, e.g., greater than 3 micrometers, 10 micrometers, 50 micrometers, or more.

An interface assembly 310 includes a collar 312, a cover 314, a seal 316, and the conduit 308. The interface assembly 310 is configured to interface with the one or more conduits of the evacuation station 200, e.g., with the conduit 212 (shown in FIG. 2A). For example, when the filtering device 300 is disposed into the receptacle 222 of the evacuation station 200 and the conduit 212 of the evacuation station 200 is in a protruded position, the intake 218 is placed into pneumatic communication with the receptacle 302 of the filtering device 300. Hence, when the robot 102 interfaces with the evacuation station 200, the debris bin 124 of the robot 102 is also placed into pneumatic communication with the receptacle 302 of the filtering device 300.

Figure 4:
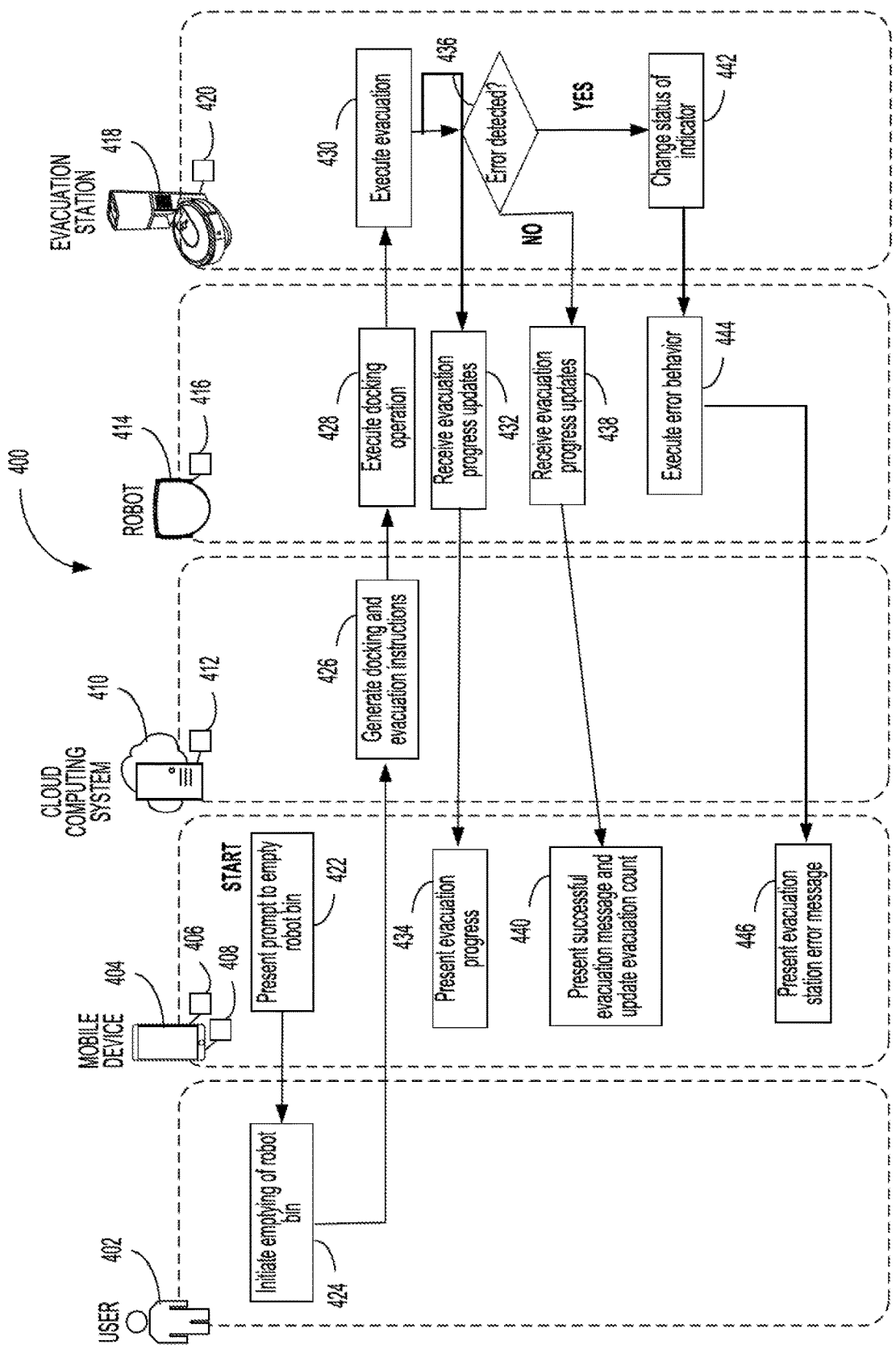
FIG. 4. is a flow chart depicting a process for transmitting data among a mobile device, a cloud computing system, an autonomous cleaning robot, and an evacuation station.

An executable application, operating on a mobile device, may communicate with the evacuation station 200 and the robot 102 allowing a user to monitor statuses of the evacuation station 200 and the robot 102. Referring to FIG. 4, a flow chart 400 depicts a process for transmitting data among a mobile device 404, a cloud computing system 410, an autonomous cleaning robot 414, and an evacuation station 418. In this flow chart 400, the mobile device 404 communicates with the evacuation station 418 through the autonomous cleaning robot 414. In some implementations, the mobile device 404 and the evacuation station 418 may communicate with each other directly.

To start, a controller 406 of the mobile device 404 presents at operation 422, via a mobile application 408, a prompt to empty the bin (like debris bin 124) of the robot 414. The user 402, at operation 424, initiates emptying of the bin 124 by, for example, selecting an option presented on a display of the mobile device 404. A cloud computing system 410, via a processor 412, at operation 426 generates instructions for docking the robot 414 at the evacuation station 418 such that the bin can be emptied. The cloud computing system 410 sends the docking instructions to the robot 414, which are then executed at operation 428 by a controller 416 controlling a drive system (e.g., wheels, etc.) of the robot 414. Upon the robot 414 docking at the evacuation station 418, a controller 420 instructs the evacuation station, at operation 430, to execute evacuating the bin 124 of the robot 414. During the evacuation, the controller 420 receives data (e.g., from sensor 208, etc.) to, at operation 436, check for errors. A more detailed description of this error checking operation 436 is given below with respect to FIG. 5. The controller 420 of the evacuation station 418 sends evacuation progress updates, at operations 432, 438, to the controller 416 of the robot 414. In some implementations, the controller 420 sends evacuation progress updates to the cloud computing system 410, to the mobile device 404 directly, etc.

Based on the evacuation progress updates 432, 438, the mobile device 404 presents, on a display 106, evacuation progress at operation 434 or an indication that an evacuation has completed successfully at operation 440. If an error is detected during evacuation, the controller 420 of the evacuation station 418 changes a status, at operation 442, of the indicator 120 to indicate the error (e.g., by flashing, changing color, etc.). If an error is detected during evacuation, the controller 420 of the evacuation station 418 sends information indicating the error to the robot 414 and the mobile device 404. In this example, at operation 444, the robot 414, upon receiving an indication of an error, executes an error response behavior (e.g., emits an audio signal, illuminates an indicator, reattempts a docking behavior, etc.). Based on the indication of the error received from the evacuation station 418, the mobile device 404 presents, at operation 446, an error message, indicating that the evacuation station needs attention from the user 402. As shown below in FIGS. 6A-7C, indications of errors may be presented as icons, text, buttons, etc.

Figure 5:
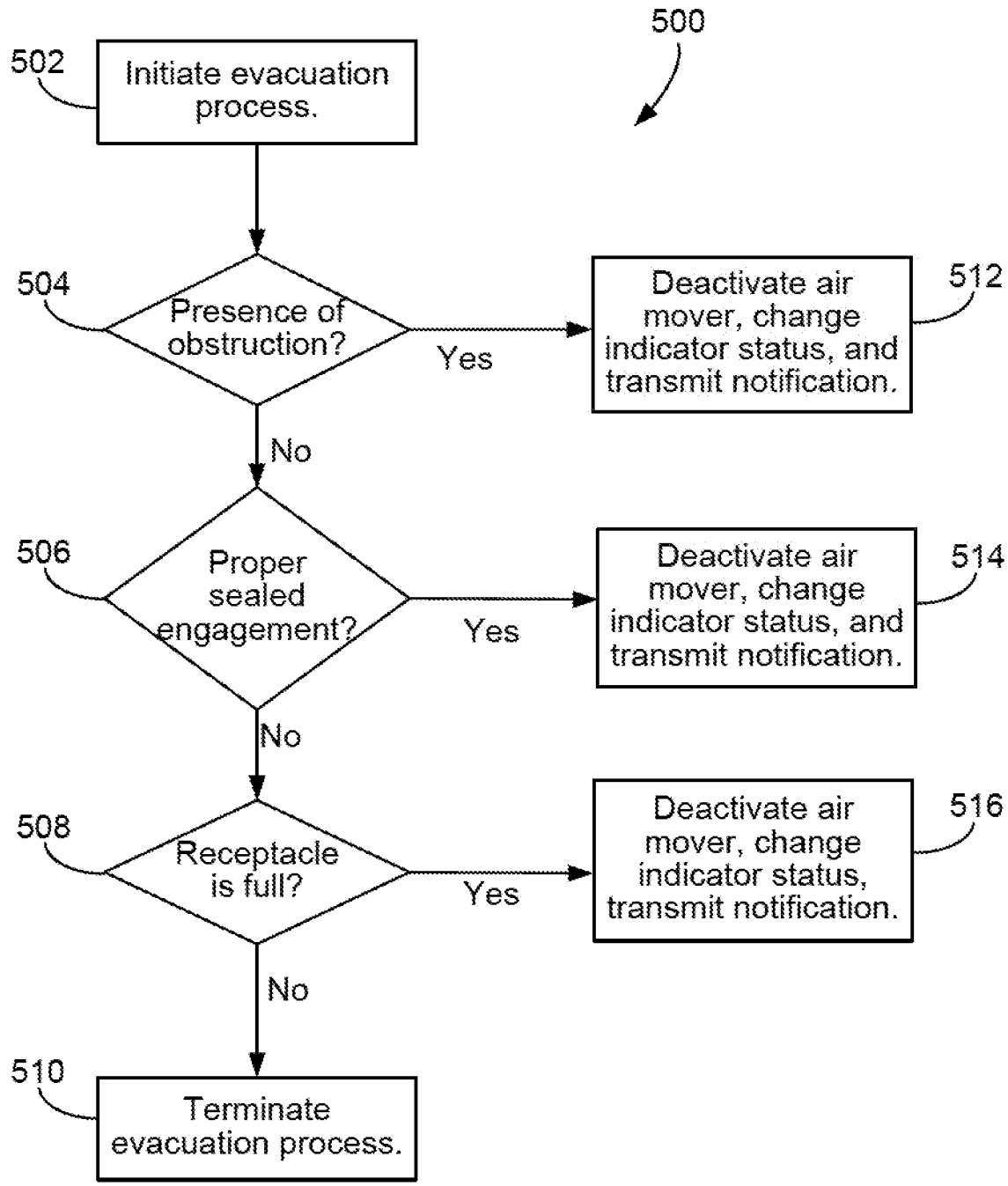
FIG. 5 is a flow chart depicting a process for evaluating an evacuation process at the evacuation station of FIG. 1.

An example of the error detection operation 436, as shown in FIG. 4, is explained in more detail in FIG. 5, which illustrates an example process 500 executed by the controller 118 of the evacuation station 100. After the robot 102 has docked at the evacuation station 100, the controller 118 at operation 502 initiates an evacuation process. During the evacuation process, the controller 118 activates the air mover 216, thereby generating the airflow to evacuate debris from the debris bin 124 of the robot 102.

In some implementations, the sensor 208 (shown in FIG. 2A) can be a pressure sensor that generates one or more signals indicative of a steady-state pressure within the receptacle 222 of the evacuation station 200. During the evacuation process, the controller 118 can transmit (via a transceiver) data indicative of a steady-state pressure, indicative of a fullness state of the evacuation station 200 to the mobile device 104. For example, the controller 118 can directly transmit the data to the mobile device 104, e.g., via a Bluetooth, LAN, or other appropriate wireless communication protocol, or the controller 118 can transmit the data to the mobile device 104 via a remote server.

At operation 504, the controller 118 determines a presence or absence of a clog or other type of obstruction within flow pathways of the evacuation station 100. If the controller 118 determines the presence of a clog or other obstruction, the controller 118 at operation 512 can deactivate the air mover 216 and transmit (via a transceiver) a notification to the user, via the mobile device 104, to indicate that a clog or other obstruction has been detected. The controller can also change a state of the indicator 120 (e.g., to pulsing red) to indicate to a user that the evacuation station 100 requires attention.

At operation 506, the controller 118 determines whether a proper sealed engagement between the seal 316 and the conduit 212 has been formed. If the controller 118 determines a proper sealed engagement has not been formed, the controller 118 at operation 514 can deactivate the air mover 216 and transmit a notification to the user, via the mobile device 104, to indicate that an improper sealed engagement has been detected. The controller can also change a state of the indicator 120 (e.g., to pulsing red) to indicate to a user that the evacuation station 100 requires attention.

At operation 508, the controller 118 determines whether the receptacle 302 of the filtering device 300 is full. If the controller 118 determines the receptacle 302 of the filtering device 300 is full, the controller 118 at operation 516 can deactivate the air mover 216 and transmit a notification to the user, via the mobile device 104, to indicate that the receptacle 302 of the filtering device 300 is full. The controller can also change a state of the indicator 120 (e.g., to solid red) to indicate to a user that the evacuation station 100 requires attention.

The controller 118 can make the determinations in operations 504, 506, 508 using the one or more signals received from the sensor 208. As described herein, the sensor 208 can be a pressure sensor that generates the one or more signals indicative of a steady-state pressure within the receptacle 222 of the evacuation station 200, and this steady-state pressure can be indicative of a presence or absence of a clog or other obstruction, a proper or improper sealed engagement, a fullness state of the filtering device 300, etc. For example, if the one or more signals is indicative of a steady-state pressure larger than an expected range for the steady-state pressure, the controller 118 can determine that a clog or other obstruction is present within the airflow pathways of the evacuation station 100. The expected range for the steady-state pressure can be computed based on the range of steady-state pressures detected by the sensor 208 during previous successful evacuation processes performed by the evacuation station 100.

At operation 510, if a duration (e.g., a set duration) for the evacuation process has elapsed and the triggering events for operations 504, 506, 508 have not occurred, the controller 118 terminates the evacuation process. The controller 118 can deactivate the air mover 216 and transmit a notification to the user to indicate that the evacuation process has been completed. The controller can also change a state of the indicator 120 (e.g., to solid white) to indicate to a user that an evacuation has been completed successfully.

FIGS. 6A-11 illustrate various types of information that can be presented, edited, etc. on the display 106 of the mobile device 104. For example, information may be presented on the display 106 to inform the user 402 of statuses of the evacuation station 200 and the robot 102, to allow the user to initiate an evacuation of the bin 124, etc.

Figure 6B:
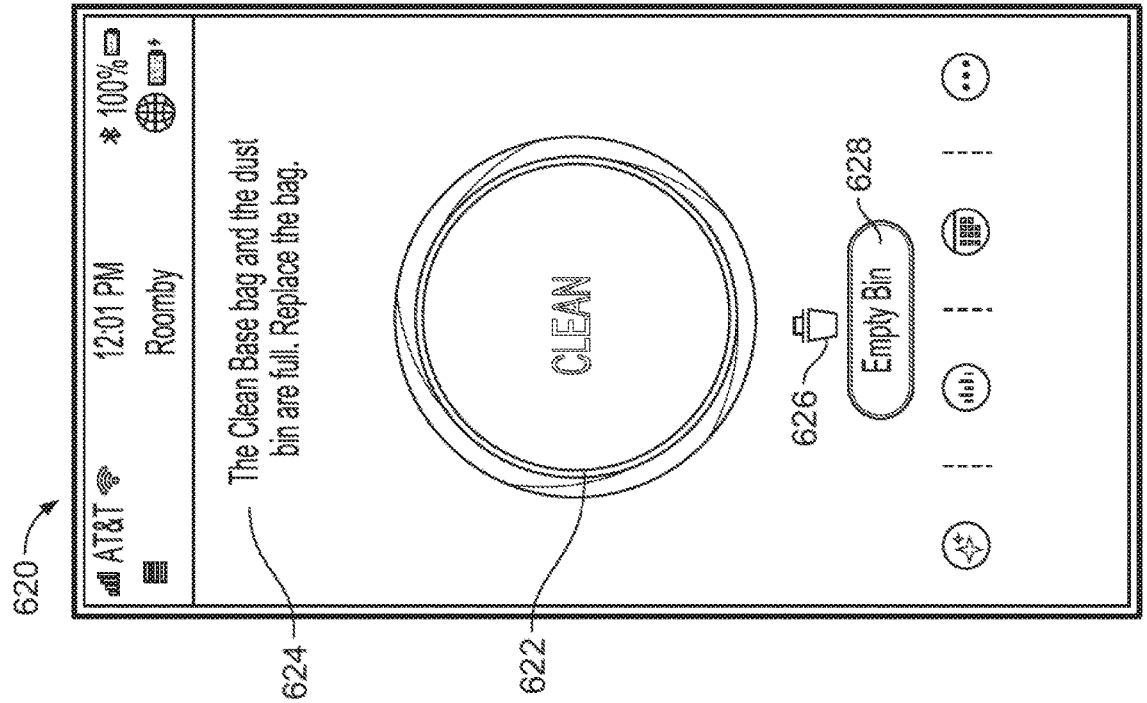
FIGS. 6A-6D are interfaces showing statuses of the autonomous cleaning robot and the evacuation station of FIG. 1.
Figure 6A:
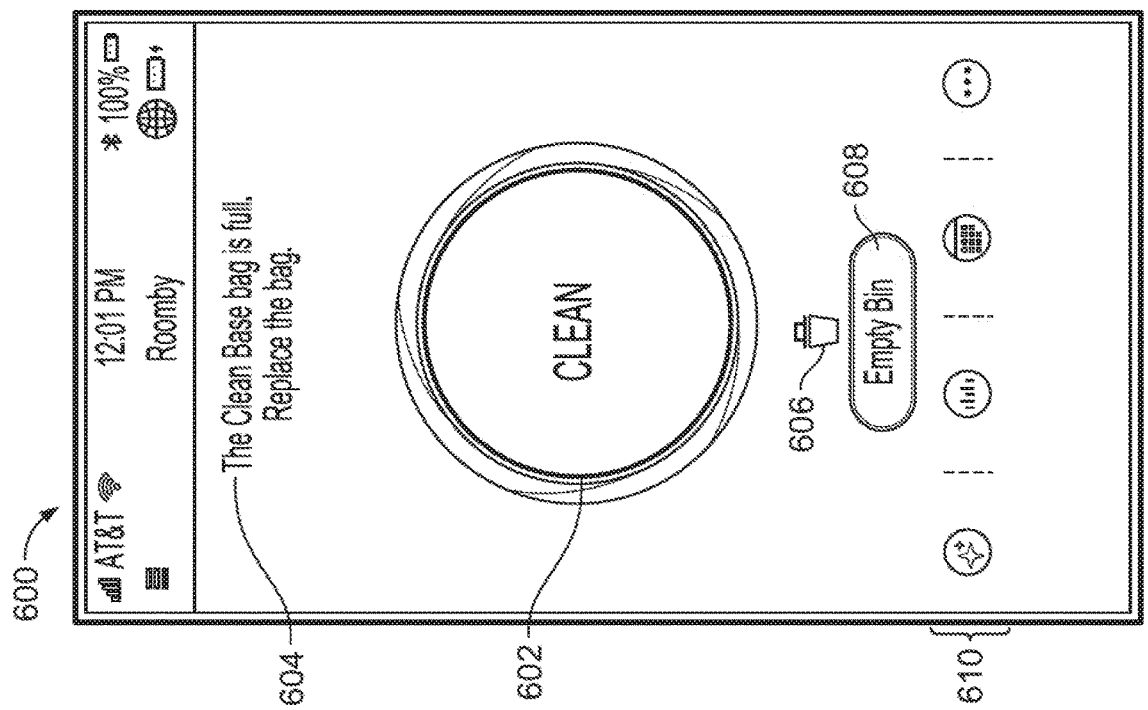

Referring to FIG. 6A, an interface 600 presents a clean button 602 that allows the user 402 to initiate a cleaning mission by the robot 102. A text indicator 604 and an icon 606 indicate to the user 402 that the filter bag 304 is full and needs to be emptied. The clean button 602 is selectable because the robot 102 can execute cleaning missions while the filter bag 304 of the evacuation station 200 is full. The interface 600 also includes an array of icons to allow the user 402 to navigate to other functions (e.g., scheduling, mapping, etc.) of the mobile application 408. As the robot 102 executes a cleaning mission initiated by the user 402 pressing cleaning button 602, the bin 124 of the robot 102 fills with debris. The interface 600 also presents an unselectable empty bin button 608 (e.g., the button 608 is greyed out) indicating that the bin 124 of the robot 102 cannot be evacuated because the filter bag 304 of the evacuation station 200 is full.

Referring to FIG. 6B, an interface 620 presents a text indicator 624 and an icon 626 to indicate to the user 402 that the filter bag 304 of the evacuation station 200 and the debris bin 124 of the robot 102 are full. The interface 620 also presents an unselectable empty bin button 628 (e.g., the button 628 is greyed out) indicating that the bin 124 of the robot 102 cannot be evacuated because the filter bag 304 of the evacuation station 200 is also full. In the interface 620, a clean button 622 is also unselectable (e.g., the clean button 602 is greyed out) to indicate that the robot 102 cannot be instructed to execute a cleaning mission when the bin 124 of the robot is full and cannot be emptied (because the filter bag 304 of the evacuation station 200 is also full).

Figure 6C:
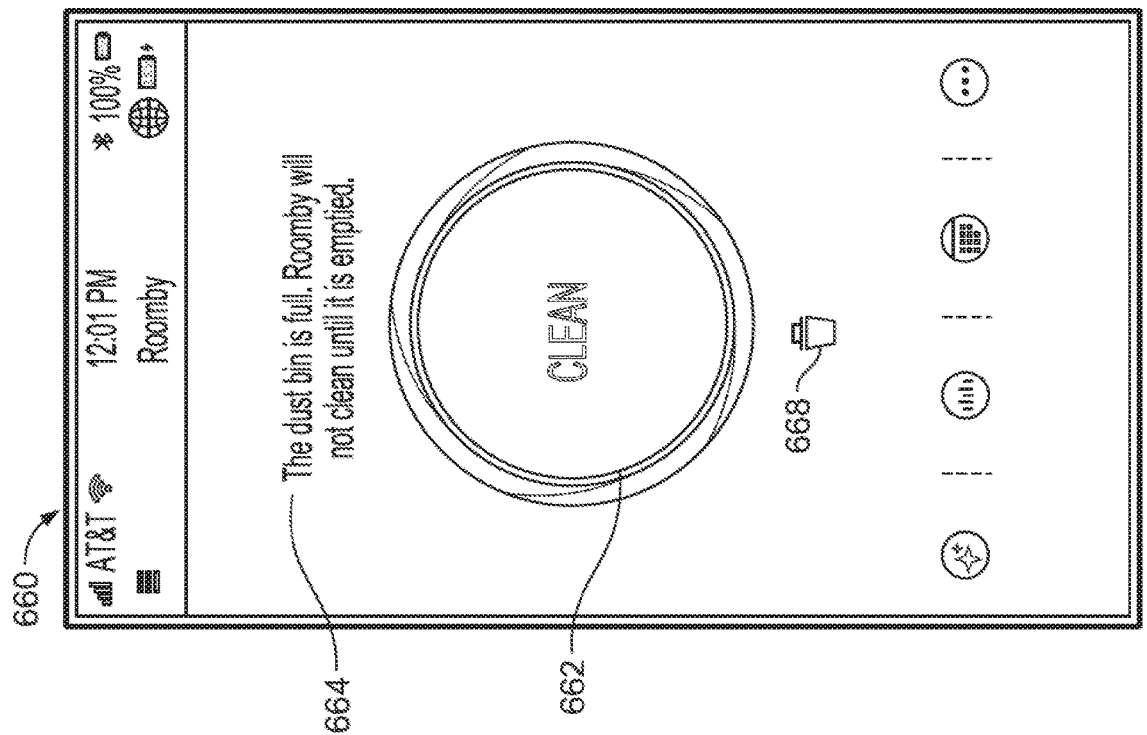

Referring to FIG. 6C, an interface 640 presents a text indicator 644 and an icon 646 to indicate to the user 402 that the debris bin 124 of the robot 102 is full. The interface 640 also presents a selectable empty bin button 648 indicating that the filter bag 304 of the evacuation station 200 is not full and that the robot 102 can be emptied at the evacuation station 200. Selecting the empty bin button 648 (now darkened to indicate that the empty bin button 648 is selectable) causes the robot 102 to initiate a docking operation at the evacuation station 200. Upon docking at the evacuation station 200, the evacuation station 200 will initiate evacuating the bin 124. The interface 640 also presents a selectable clean button 642 that allows a user 402 to initiate a cleaning mission despite the bin 124 being full. For example, the bin 124 may be full with compressible material (e.g., pet hair, dust, etc.) that can be compressed as more debris is picked up by the robot 102 during a cleaning mission.

Figure 6D:
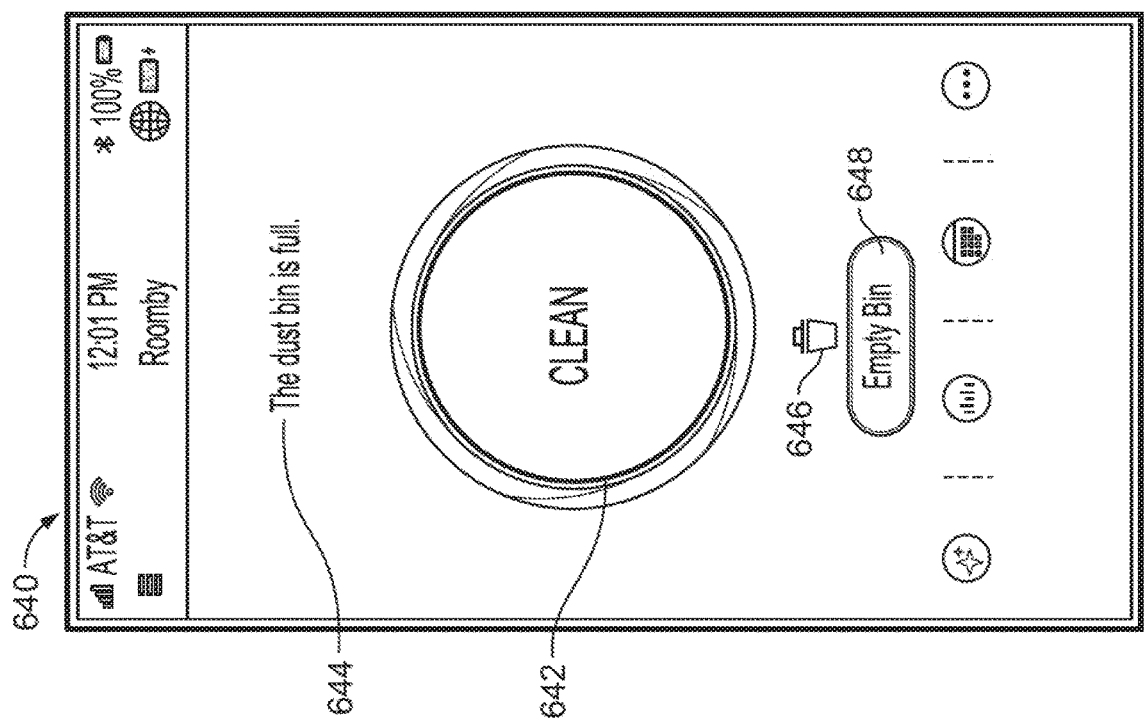

Referring to FIG. 6D, an interface 660 presents a text indicator 664 and an icon 668 to indicate to the user 402 that the debris bin 124 of the robot 102 is full. The interface 660 presents an unselectable clean button 662 indicating that a cleaning mission may not be initiated until the bin 124 is emptied. Empty bin button 648 is absent from interface 660 indicating that the robot 102 has begun docking at the evacuation station 200 to empty the bin 124.

In some implementations, the mobile device 104 may present, on the display 106, a first icon indicating that the bin 124 of the robot 102 is full and a second icon indicating that the filter bag 304 of the evacuation station 200 is full. The first and second icons may be accompanied by text indications.

Figure 6E:
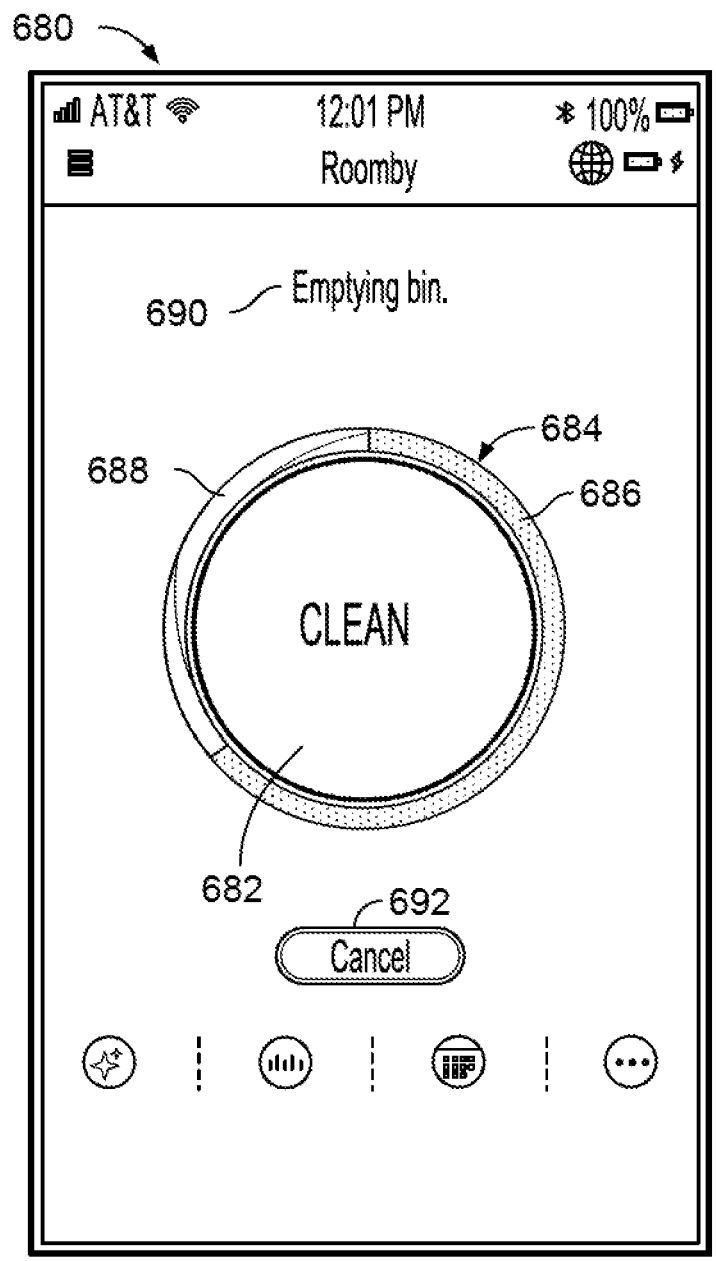
FIG. 6E is an interface showing a status of an evacuation of the autonomous cleaning robot at the evacuation station of FIG. 1.

Referring to FIG. 6E, an interface 680 presents a text indicator 690 to inform the user 402 that the bin 124 of the robot 102 is being evacuated at the evacuation station 200. The interface 680 also presents a cancel button 692 allowing the user 402 to cancel the evacuation operation. The interface 680 also presents an evacuation status indicator 684 surrounding a selectable clean button 682. The evacuation status indicator 684 includes a filled portion 686 and an unfilled portion 688, which are presented in different colors, wherein the filled portion 686 expands into the unfilled portion 688 as the evacuation operation progresses. The ratio of an area of the filled portion 686 compared to the area of the evacuation status indicator 684 corresponds to a percentage of the evacuation operation that has been completed.

Figure 7A:
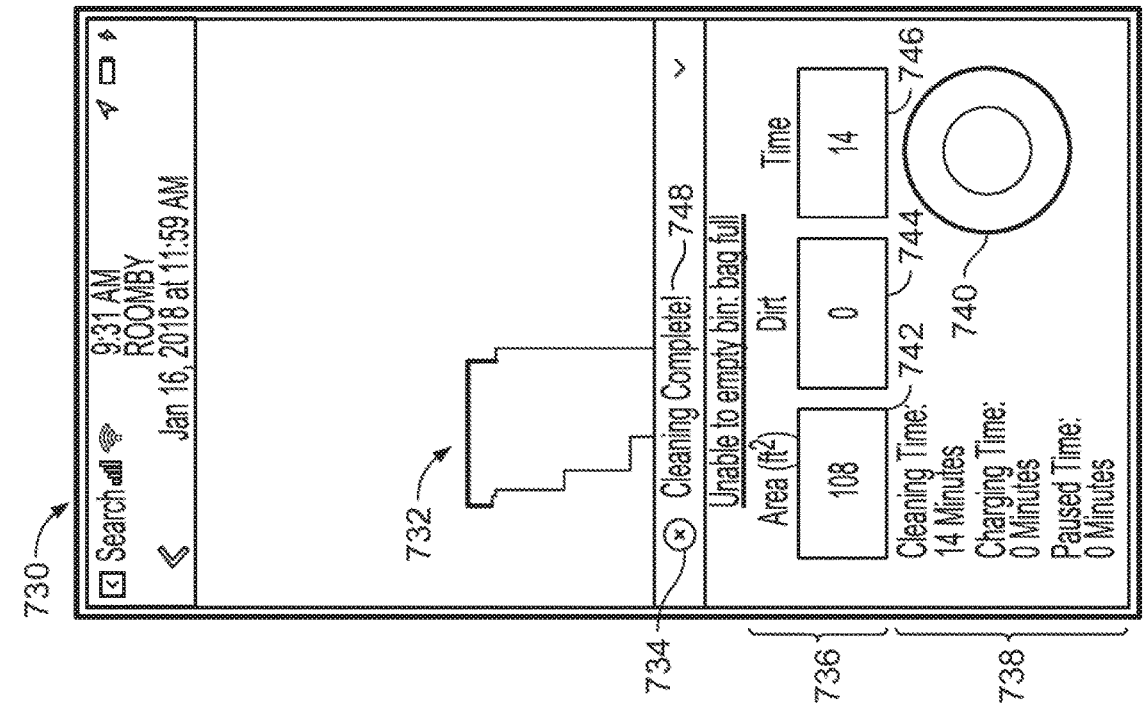
FIGS. 7A-7C are interfaces showing a map and cleaning parameters of a cleaning mission of the autonomous cleaning robot of FIG. 1.
Figure 7B:
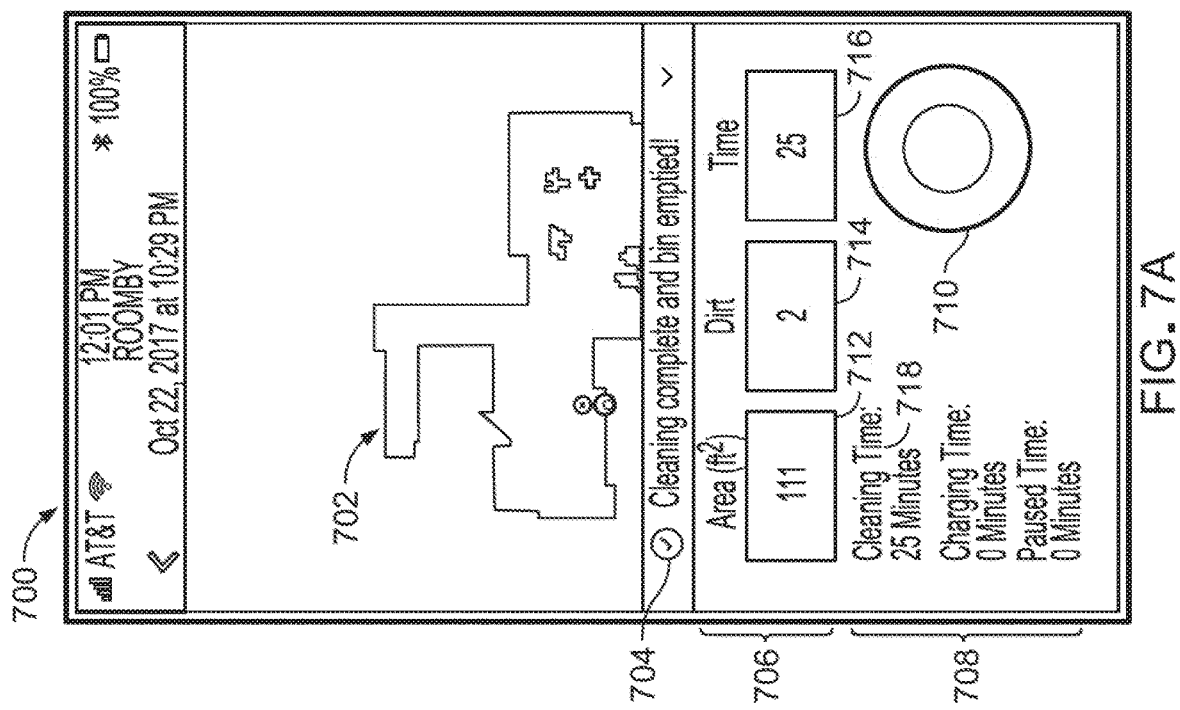
Figure 7C:
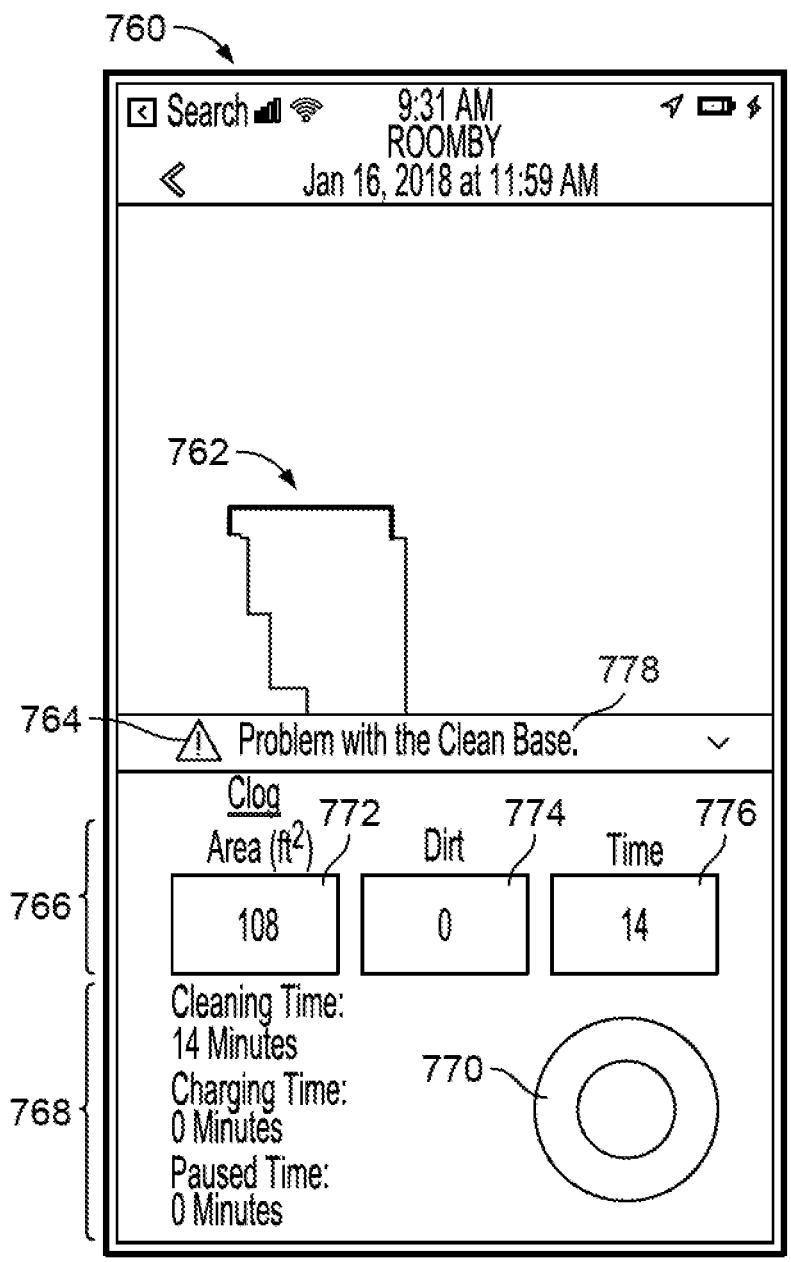

Generally, FIGS. 7A-7C show summaries of three different cleaning missions. Referring to FIG. 7A, an interface 700 presents a map 702 corresponding to areas cleaned by the robot 102 during a cleaning mission. The interface 700 also presents a status message 704 of the cleaning mission, here, that the mission was completed successfully. The interface also presents a summary 706 of mission statistics including an amount of an area cleaned 712, a number of dirt events (e.g., instances where the robot 102 detected a high concentration of debris) detected 714, and an elapsed mission time 716. The interface 700 also presents a circular graphic 710 of a breakdown 708 of the elapsed mission time 716. Here, sections of the circular graphic 710 match a color of the cleaning time parameter 718 to show that 100% of the elapsed mission time 716 was spent cleaning. In implementations, the circular graphic 710 may include multiple colors corresponding to other parameters (e.g., charging, paused, etc.) shown in the breakdown 708, with the colored sections of the circular graphic 710 representing portions of the elapsed mission time 716 spend in each state. Here, however, all of the elapsed time 716 was spent cleaning, so the circular graphic 710 includes one section matching the color of the cleaning time parameter 718.

Figure 10:
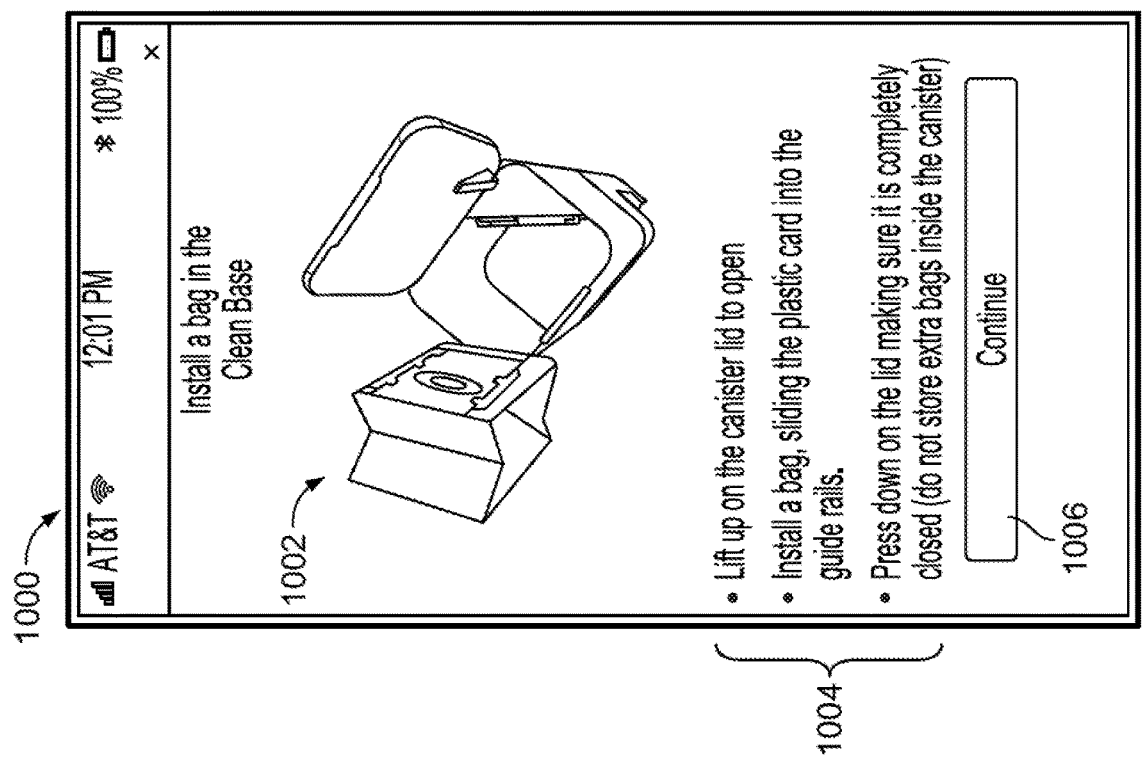
FIG. 10 is an interface showing instructions for emptying a bag of the evacuation station of FIG. 1.

Referring to FIG. 7B, an interface 730 presents a map 732 corresponding to areas cleaned by the robot 102 during a cleaning mission. The interface 730 also presents a status 734 of the cleaning mission, here, that the mission was stopped because the filter bag 304 of the evacuation station 200 is full and the bin 124 of the robot 102 cannot be emptied. The status 734 includes a selectable text indicator 748 that, when selected, opens an instruction interface including instructions informing the user 402 how to correct the problem identified in the text indicator 748. For example, selecting the selectable text indicator 748 opens an interface 1000, as shown in FIG. 10 that includes a diagram 1002 and text instructions 1004 informing a user how to install a new filter bag 304 in the evacuation station 200. Selecting continue button 1006 on the interface 1000 may return the user 402 to the mission summary interface 730 or to another interface allowing the user 402 to initiate resuming the cleaning mission.

The interface also presents a summary 736 of mission statistics including an area cleaned 742, a number of dirt events detected 744, and an elapsed mission time 746. The interface 730 also presents a graphical representation 740 of a breakdown 738 of the elapsed mission time 746. Here, the graphical representation 740 matches a color of the cleaning time parameter 718 to show that 100% of the elapsed mission time 746 was spent cleaning.

Referring to FIG. 7C, an interface 760 presents a map 762 corresponding to areas cleaned by the robot 102 during a cleaning mission. The interface 760 also presents a status 764 of the cleaning mission, here, that the mission was stopped because of a clog in the evacuation station 200. The status 764 includes a selectable text indicator 778 that, when selected, opens an instruction interface including instructions informing the user 402 how to correct the problem identified in the text indicator 778. The interface also presents a summary 766 of mission statistics including an area cleaned 772, a number of dirt events detected 774, and an elapsed mission time 776. The interface 760 also presents a graphical representation 770 of a breakdown 768 of the elapsed mission time 776. Here, the graphical representation 770 matches a color of the cleaning time parameter 778 to show that 100% of the elapsed mission time 776 was spent cleaning.

Referring to FIG. 8, an interface 800 is presented on the display 106 of the mobile device 104, showing a cleaning preferences menu 802 including selectable cleaning settings 804, 806, 808, 812. Selectable cleaning settings 804 and 806 allow the user 402 to access and change carpet boost settings and cleaning pass settings, respectively. Selectable cleaning setting 808 allows the user 402 to turn on or to turn off, via a toggle 810, edge cleaning. Selectable cleaning parameter 812 allows the user 402 to access and change automatic empty settings, as shown in FIG. 9. Selecting selectable cleaning parameter 812 opens interface 900 which includes a menu 902 of automatic empty settings. The user 402 may select one of the options 904, 906, 908 to set an automatic empty setting for the robot 102. Check 910 indicates which of the options 904, 906, 908 is selected. If the user selects setting 904, the robot 102 operates under a smart empty protocol, wherein the robot 102 determines when to automatically empty the bin 124 at the evacuation station 200 based on one or more conditions being satisfied. This determination can be made based on sensor data obtained on the robot 102. Examples of sensor data include a bin fullness reading, navigation data, an amount of time cleaned (e.g., do not empty if the robot 102 has been cleaning for less than a certain amount of time), how the robot 102 got onto the evacuation station 200 (e.g., evacuates if robot 102 drove onto evacuation station 200, but not if the robot 102 was manually placed on the evacuation station 120), previous evacuation success or failure (empty if robot 102 attempted but failed to empty when last docked), etc. Other examples of sensor data include a time of day, an amount of area vacuumed, specific locations vacuumed, proximity of the robot 102 to the evacuation station 200, locations cleaned vs. planned cleaning locations (e.g., empty before moving into the living room), a user's schedule (e.g., empty at evacuation station 200 when user is away from home), etc. If the user selects setting 906, the robot 102 automatically empties the bin 124 any time that the robot 102 is placed on the evacuation station 200. If the user selects setting 908, the robot 102 does not automatically empty the bin 124, meaning that the user 402 must initiate an evacuation of the robot 102 at the evacuation station (e.g., by a button on the robot or a selectable button in the mobile application 110 on the mobile device 104).

Figure 11:
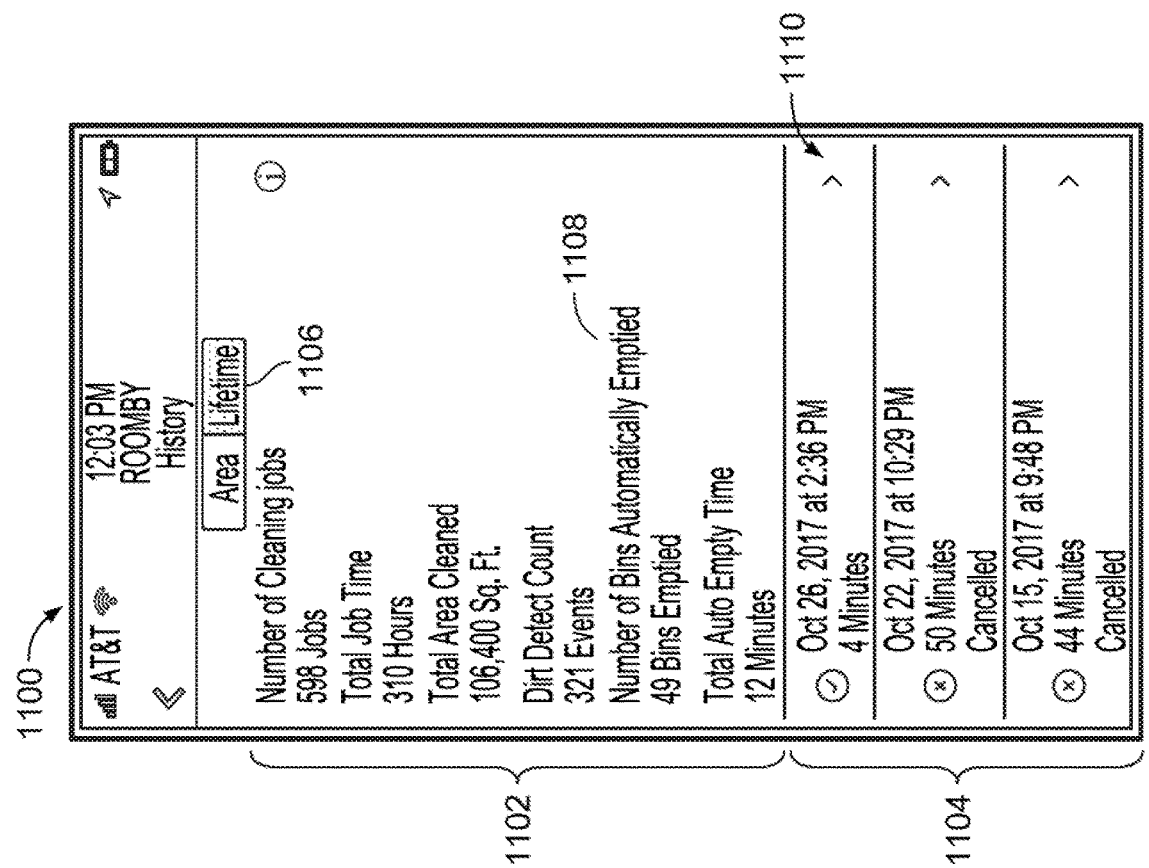
FIG. 11 is an interface showing a performance history of the autonomous cleaning robot of FIG. 1.

Referring to FIG. 11, presents, on the display 106 of the mobile device 104, an interface 1100 showing a performance history of the robot 102 and the evacuation station 200. A summary 1102 on the interface 1100 includes statistics related to cleaning missions, including a number of cleaning missions completed, a total cleaning run time, a total area cleaned, a number of dirt events detected, a total automatic empty time, and a number of bins automatically emptied 1108. Each time the bin 124 of the robot 102 is emptied at the evacuation station 200, the controller 118 of the evacuation station 200 or the controller 126 of the robot 102 sends the mobile device 104 an indication that the evacuation operation has been completed. Upon receipt, the mobile device 104 increases the count presented at item 1108 by one.

The interface also includes a toggle 1106 allowing the user 402 to switch between presenting lifetime statistics and presenting area-based statistics. For example, lifetime statistics may be based on all cleaning missions completed or attempted by the robot 102. In another example, the area-based statistics may be based on all cleaning missions completed or attempted by the robot 102 (and possibly other robots 102 communicating with the mobile application 104) in a particular area (e.g., a floor or a room of the user's home). Switching back and forth between lifetime statistics and area-based statistics changes the counts presented in the items in summary 1102. The interface 1100 also includes a list 1104 of recent cleaning missions. Arrows, e.g., arrow 1110, allow the user 402 to open a selected cleaning mission where an interface such as interfaces 700, 730, 760, shown in FIGS. 7A-7C, may be presented to the user 402 with more detail about the cleaning mission.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A mobile device operably controlling an operation of an autonomous cleaning robot, the mobile device comprising:
a user interface, including a display and a user input device; and
a controller configured to:
receive information about a fullness status of a bin of the autonomous cleaning robot for collecting debris, and information about a fullness status of a filter bag of an evacuation station for receiving the debris emptied from the bin of the autonomous cleaning robot; and
present on the display one or more user-interface (UI) controls conditionally selectable via the user input device to control the operation of the autonomous cleaning robot, the one or more UI controls being selectable when the fullness status of the bin and the fullness status of the filter bag satisfy respective conditions, and unelectable when the fullness status of the bin or the fullness status of the filter bag fail to satisfy the respective conditions,
wherein, when the fullness status of the bin indicates that the bin is full and the fullness status of the filter bag indicates the filter bag is not full, the one or more UI controls presented include (i) a first selectable UI control for instructing the autonomous cleaning robot to dock at the evacuation station and empty the bin therein, and (ii) a second selectable UI control for instructing the autonomous cleaning robot to initiate or continue cleaning despite the bin being full.

2. The mobile device of claim 1, wherein the controller is configured to present on the display a first visual indicator of the fullness status of the bin.

3. The mobile device of claim 2, wherein the controller is configured to concurrently present on the display (i) the first visual indicator indicating the bin being full and (ii) the second selectable UI control, the concurrent presentation indicating compressible debris in the bin despite being full.

4. The mobile device of claim 1, wherein the controller is configured to present on the display a second visual indicator of the fullness status of the filter bag.

5. The mobile device of claim 1, comprising a communication circuit configured to establish data communication between the mobile device and the autonomous cleaning robot.

6. The mobile device of claim 5, wherein the controller is configured to receive the information about the fullness status of the bin of the autonomous cleaning robot via the communication circuit.

7. The mobile device of claim 5, wherein, when the first selectable UI control is selected, the controller is configured to initiate a transmission to the autonomous cleaning robot via the communication circuit, the transmission comprising data for causing the autonomous cleaning robot to dock at the evacuation station and to empty the bin therein.

8. The mobile device of claim 5, wherein, when the second selectable UI control is selected, the controller is configured to initiate a transmission to the autonomous cleaning robot via the communication circuit, the transmission comprising data for causing the autonomous cleaning robot to initiate or continue cleaning despite the bin being full.

9. The mobile device of claim 5, wherein the communication circuit is further configured to establish data communication between the mobile device and the evacuation station,
wherein the controller is configured to receive the information about the fullness status of the filter bag via the communication circuit.

10. The mobile device of claim 1, wherein the controller is configured to present, on the display, information about a number of instances that the bin has been emptied.

11. The mobile device of claim 1, wherein the controller is configured to present, on the display, information about a progress or an amount of time elapsed for emptying the bin of the autonomous cleaning robot at the evacuation station.

12. A method of operating an autonomous cleaning robot, the method comprising:
receiving, at a mobile device, information about a fullness status of a bin of the autonomous cleaning robot for collecting debris, and information about a fullness status of a filter bag of an evacuation station for receiving the debris emptied from the bin of the autonomous cleaning robot;
presenting, on a display of the mobile device, one or more user-interface (UI) controls conditionally selectable via a user input device to control an operation of the autonomous cleaning robot, the one or more UI controls being selectable when the fullness status of the bin and the fullness status of the filter bag satisfy respective conditions, and unelectable when the fullness status of the bin or the fullness status of the filter bag fail to satisfy the respective conditions,
wherein, when the fullness status of the bin indicates that the bin is full and the fullness status of the filter bag indicates the filter bag is not full, the one or more UI controls presented include (i) a first selectable UI control for instructing the autonomous cleaning robot to dock at the evacuation station and empty the bin therein, and (ii) a second selectable UI control for instructing the autonomous cleaning robot to initiate or continue cleaning despite the bin being full.

13. The method of claim 12, comprising presenting, on the display of the mobile device, a first visual indicator of the fullness status of the bin.

14. The method of claim 13, comprising concurrently presenting, on the display of the mobile device, (i) the first visual indicator indicating the bin being full and (ii) the second selectable UI control, the concurrent presentation indicating compressible debris in the bin despite being full.

15. The method of claim 12, comprising presenting, on the display of the mobile device, a second visual indicator of the fullness status of the filter bag.

16. The method of claim 12, comprising establishing data communication between the mobile device and the evacuation station via a communication circuit, and receive the information about the fullness status of the bin of the autonomous cleaning robot through the established data communication.

17. The method of claim 12, wherein, when the first selectable UI control is selected, initiating a transmission to the autonomous cleaning robot via a communication circuit, the transmission comprising data for causing the autonomous cleaning robot to dock at the evacuation station and to empty the bin therein.

18. The method of claim 12, wherein, when the second selectable UI control is selected, initiating a transmission to the autonomous cleaning robot via a communication circuit, the transmission comprising data for causing the autonomous cleaning robot to initiate or continue cleaning despite the bin being full.

19. The method of claim 12, comprising presenting, on the display, information about a number of instances that the bin has been emptied.

20. The method of claim 12, comprising presenting, on the display, information about a progress or an amount of time elapsed for emptying the bin of the autonomous cleaning robot at the evacuation station.

* * * * *